United States Patent
Saishi et al.

[19]

[11] Patent Number: 6,167,420
[45] Date of Patent: Dec. 26, 2000

[54] MULTIPLICATION METHOD AND MULTIPLICATION CIRCUIT

[75] Inventors: Mana Saishi; Shunichi Kurohmaru, both of Fukuoka, Japan

[73] Assignee: Matsushita Electric Industrial Co., Ltd., Osaka, Japan

[21] Appl. No.: 09/520,014

[22] Filed: Mar. 6, 2000

Related U.S. Application Data

[62] Division of application No. 09/052,064, Mar. 31, 1998.

[30] Foreign Application Priority Data

Apr. 1, 1997 [JP] Japan .................................. 9-082559

[51] Int. Cl.$^7$ ...................................................... G06F 7/52
[52] U.S. Cl. ............................................................ 708/620
[58] Field of Search .................................. 708/620, 550, 708/551, 627–630

[56] References Cited

U.S. PATENT DOCUMENTS

| | | |
|---|---|---|
| 4,841,468 | 6/1989 | Miller et al. . |
| 4,876,660 | 10/1989 | Owen et al. . |
| 4,941,120 | 7/1990 | Brown et al. . |
| 5,128,889 | 7/1992 | Nakano . |
| 5,208,770 | 5/1993 | Ito . |
| 5,276,634 | 1/1994 | Suzuki et al. . |
| 5,521,855 | 5/1996 | Yamazaki ................................ 708/628 |
| 6,038,583 | 3/2000 | Oberman et al. ........................ 708/628 |

FOREIGN PATENT DOCUMENTS

| | | |
|---|---|---|
| 61-188624 | 8/1986 | Japan . |
| 62-85333 | 4/1987 | Japan . |
| 1111229 | 4/1989 | Japan . |
| 1230127 | 9/1989 | Japan . |
| 473249 | 6/1992 | Japan . |
| 580978 | 4/1993 | Japan . |
| 5224888 | 9/1993 | Japan . |
| 6348455 | 12/1994 | Japan . |
| 793132 | 4/1995 | Japan . |
| 7114454 | 5/1995 | Japan . |
| 63298526 | 12/1998 | Japan . |

OTHER PUBLICATIONS

JPO Search Report dated Aug. 18, 1998 with English translation of Office Action.
European Search Report, EP 98 10 5884, dated Jun. 26, 1998.
Lu F et al: "A Bit–Level Pipelined Implementation of a CMOS Multiplier–Accumulator Using a New Pipelined Full–Adder Cell Design," proceedings of the Annual International Phoenix Conference on Computers and Communications, Scottsdale, Mar. 22–24, 1989, No. Conf.8, Mar. 22, 1989, Institute of Electrical and Electronics Engineers, pp. 49–53, XP000040896 * p. 53, left column, paragraph 1–paragraph 4; figure 2 *.
Wonyong Sung: "An Automatic Scaling Method for the Programming of Fixed–Point Digital Signal Processors," Signal Image and Video Processing, Singapore, Jun. 11–14, 1991, vol. 1, No. SYMP. 24, Jun. 11, 1991, Institute of Electrical and Electronics Engineers, pp. 37–40, XP000384735 * figure 3 *.
Copy of Office Action dated Mar. 2, 1999, Japanese Patent Appln. No. 078695–1998, with full English translation.

*Primary Examiner*—Tan V. Mai
*Attorney, Agent, or Firm*—Stevens, Davis, Miller & Mosher, L.L.P.

[57] ABSTRACT

A multiplication method and a multiplication circuit, wherein a multiplicand is multiplied by a multiplier by using a multiplication means, the result of the multiplication is added by an addition means to a rounding signal to be output from a rounding signal generation means, and the result of the addition, i.e., a multiplication result obtained after rounding, is stored in a register. By a barrel shifter, the multiplication result obtained after rounding stored in the register is shifted by a bit count indicated by a shift bit count signal. The shift bit count signal output from an instruction control means is input to the barrel shifter and a rounding signal generation means. The rounding signal generation means generates a rounding signal on the basis of the shift bit count signal indicating the bit count used to shift the multiplication result after rounding. By carrying out a rounding process in the addition means by using the rounding signal, the rounding process can be carried out at an appropriate position desired by the user.

9 Claims, 7 Drawing Sheets

MULTIPLICATION METHOD AND MULTIPLICATION CIRCUIT

This is a division of application Ser. No. 09/052,064 filed Mar. 31, 1998.

BACKGROUND OF THE INVENTION

1. Field of the Invention

The present invention relates to a multiplication method and a multiplication circuit for executing fixed point multiplication instructions used for digital signal processing in image and sound processing fields.

2. Prior Art

FIG. 9 is a conceptual view showing a multiplication method in a multiplication instruction provided with a conventional rounding function.

This conventional multiplication method is carried out as described below. After a multiplication result 903 obtained by the multiplication of a multiplier 901 and a multiplicand 902 is rounded by adding 1 as a rounding signal 906 at a predetermined rounding position 905 where rounding is executed, a bit range 908 up to the rounding position 905 is discarded. The result thus obtained is taken as a multiplication result 907 subjected to rounding.

In the conventional example shown in FIG. 9, however, when multiplication requiring rounding is executed, 1 is added at the predetermined position 905 without exception regardless of how the multiplication result 907 is used in a subsequent process. In this case, the bit range 908 up to the predetermined rounding position 905 becomes meaningless as a multiplication result. When it is assumed that the m-th bit from the least significant bit of the multiplication result 903 is the predetermined rounding position, a bit range capable of being cut out as the multiplication result 907 subjected to rounding is limited to a high-order bit portion having its least significant bit at the (m+1)th bit from the least significant bit of the multiplication result 903.

Therefore, when the decimal point positions of a multiplier and a multiplicand are changeable for example, and when only the integer bits are desired to be cut out after the fraction portion of the multiplication result obtained by the multiplication of the multiplier and the multiplicand is rounded, the decimal point position of the multiplication result obtained by the multiplication changes depending on the decimal point positions of the multiplier and the multiplicand. For this reason, the user trying to execute a multiplication instruction must execute a shift operation for the multiplier or the multiplicand beforehand so that the predetermined rounding position 905 is located at a position suited for rounding the fraction portion (refer to Japanese Laid-open Patent Application No. 5-224888, for example). Alternatively, the user must execute multiplication first without rounding, and then round the fraction portion of the multiplication result.

As described above, in the conventional multiplication method, the user trying to execute a multiplication instruction must shift the multiplier or the multiplicand beforehand so that the predetermined rounding position 905 is located at a suitable rounding position in order that the multiplication result 907 subjected to rounding has a bit range desired to be cut out. Alternatively, the user must execute multiplication first without rounding, and then execute rounding by addition or the like depending on the bit range desired to be cut out from the multiplication result. This causes a problem of increasing the amount of processing.

SUMMARY OF THE INVENTION

An object of the present invention is to provide a multiplication method and a multiplication circuit capable of attaining a rounding process at a suitable rounding position desired by the user without increasing the amount of processing in a process using a multiplication result subjected to rounding.

The multiplication method of the present invention comprises a multiplication process for multiplying a multiplicand by a multiplier, both obtained by a multiplication instruction, a rounding signal generation process for generating a rounding signal including a rounding value to be added to a low-order bit adjacent to the least significant bit in a given cut-out bit range of a multiplication result obtained by the multiplication process on the basis of a shift bit count signal corresponding to the difference between the least significant bit in the given cut-out bit range of the multiplication result obtained by the multiplication process and the least significant bit in a reference cut-out bit range, an addition process for adding the multiplication result obtained by the multiplication process to the rounding signal in order to generate a multiplication result obtained after rounding, and a shift process for shifting the multiplication result obtained after rounding by a shift bit count indicated by the shift bit count signal in order to cut out the given cut-out bit range from the multiplication result obtained after rounding.

With this multiplication method, by rounding the multiplication result obtained after rounding by using the rounding signal generated on the shift bit count signal corresponding to the shift bit count, the bit range to be cut out does not include any meaningless bits as a multiplication result. For a process using the multiplication result subjected to rounding, rounding can be executed at an appropriate rounding position desired by the user. Furthermore, unlike the conventional method, it is not necessary to shift the multiplier or multiplicand beforehand, and it is not necessary to execute rounding depending on the bit range desired to be cut out from the multiplication result after the multiplication is executed without rounding, thereby preventing the amount of processing from increasing. The result obtained by shifting and cutting out the multiplication result obtained after rounding generated by the addition process is referred to as a multiplication result subjected to rounding.

Furthermore, the multiplication method of the present invention, for carrying out a multiplication process by generating and adding subproducts, comprises a rounding signal generation process for generating a rounding signal including a rounding value to be added to a low-order bit adjacent to the least significant bit in a given cut-out bit range of a multiplication result obtained by the multiplication process on the basis of a shift bit count signal corresponding to the difference between the least significant bit in the given cut-out bit range of the multiplication result obtained by the multiplication process and the least significant bit in the reference cut-out bit range, a subproduct generation process for generating subproducts of a multiplier and a multiplicand obtained by a multiplication instruction, an addition process for adding all the subproducts generated by the subproduct generation process to the rounding signal in order to generate a multiplication result obtained after rounding, and a shift process for shifting the multiplication result obtained after rounding by a shift bit count indicated by the shift bit count signal in order to cut out the given cut-out bit range from the multiplication result obtained after rounding.

With this multiplication method, by rounding the multiplication result obtained after rounding by using the rounding signal generated on the shift bit count signal corresponding to the shift bit count, the bit range to be cut out does not include any meaningless bits as a multiplication result. For a process using the multiplication result subjected to rounding, rounding can be executed at an appropriate rounding position desired by the user. Furthermore, unlike the conventional method, it is not necessary to shift the multiplier or multiplicand beforehand, and it is not necessary to execute rounding depending on the bit range desired to be cut out from the multiplication result after the multiplication is executed without rounding, thereby preventing the amount of processing from increasing. In addition, by including the rounding process in the multiplication process comprising the subproduct generation process and the addition process, high-speed processing can be attained, and the size of the processing circuit can be made smaller.

Furthermore, the shift bit count signal may be used for the rounding signal generation process and the shift process after retained temporarily. With this method, the shift bit count signal can be set before the issue of the multiplication instruction by using a different instruction. It is not necessary to set the shift bit count signal by using the multiplication instruction. This prevents the length of the instruction code from increasing.

Furthermore, the shift bit count signal retained temporarily or a zero signal indicating a zero bit is selected for use in the rounding signal generation process and the shift process, and the zero signal is selected, the rounding signal generation process generates a rounding signal including a rounding value to be added to a low-order bit adjacent to the least significant bit in the reference cut-out bit range of the multiplication result obtained by the multiplication process, and the shift process carries out no shift on the multiplication result obtained after rounding. Therefore, when the zero signal is selected and used, it is possible to use the conventional multiplication method, wherein rounding is carried out at a predetermined fixed position, and no shift is carried out.

The multiplication circuit of the present invention comprises a multiplication means for inputting a multiplier and a multiplicand obtained by a multiplication instruction, and for outputting the multiplication result thereof, a rounding signal generation means for generating a rounding signal including a rounding value to be added to a low-order bit adjacent to the least significant bit in a given cut-out bit range of the multiplication result obtained by the multiplication means on the basis of a shift bit count signal corresponding to the difference between the least significant bit in the given cut-out bit range of the multiplication result obtained by the multiplication means and the least significant bit in the reference cut-out bit range, an addition means for adding the multiplication result obtained by the multiplication means to the rounding signal generated by the rounding signal generation means in order to generate a multiplication result obtained after rounding, and a shift means for shifting the multiplication result obtained after rounding generated by the addition means by a shift bit count indicated by the shift bit count signal in order to cut out the given cut-out bit range from the multiplication result obtained after rounding.

With this configuration, by rounding the multiplication result obtained after rounding by using the rounding signal generated on the shift bit count signal corresponding to the shift bit count, the bit range to be cut out does not include any meaningless bits as a multiplication result. For a process using the multiplication result subjected to rounding, rounding can be executed at an appropriate rounding position desired by the user. Furthermore, unlike the conventional method, it is not necessary to shift the multiplier or multiplicand beforehand, and it is not necessary to execute rounding depending on the bit range desired to be cut out from the multiplication result after the multiplication is executed without rounding, thereby preventing the amount of processing from increasing.

Furthermore, the multiplication circuit of the present invention, for carrying out a multiplication process by generating and adding subproducts, comprises a rounding signal generation means for generating a rounding signal including a rounding value to be added to a low-order bit adjacent to the least significant bit in a given cut-out bit range of a multiplication result obtained by the multiplication process on the basis of a shift bit count signal corresponding to the difference between the least significant bit in the given cut-out bit range of the multiplication result obtained by the multiplication process and the least significant bit in the reference cut-out bit range, a subproduct generation means for generating subproducts of a multiplier and a multiplicand obtained by a multiplication instruction, an addition means for adding all the subproducts generated by the subproduct generation means to the rounding signal generated by the rounding signal generation means in order to generate a multiplication result obtained after rounding, and a shift means for shifting the multiplication result obtained after rounding generated by the addition means by a shift bit count indicated by the shift bit count signal in order to cut out the given cut-out bit range from the multiplication result obtained after rounding.

With this configuration, by rounding the multiplication result obtained after rounding by using the rounding signal generated on the shift bit count signal corresponding to the shift bit count, the bit range to be cut out does not include any meaningless bits as a multiplication result. For a process using the multiplication result subjected to rounding, rounding can be executed at an appropriate rounding position desired by the user. Furthermore, unlike the conventional method, it is not necessary to shift the multiplier or multiplicand beforehand, and it is not necessary to execute rounding depending on the bit range desired to be cut out from the multiplication result after the multiplication is executed without rounding, thereby preventing the amount of processing from increasing. In addition, by including the rounding process in the multiplication process carried out by the subproduct generation means and the addition means, high-speed processing can be attained, and the size of the processing circuit can be made smaller.

Furthermore, a shift count retention means for temporarily retaining the shift bit count signal and for outputting the shift bit count signal to the rounding signal generation means and the shift means may be provided. With this configuration, the shift bit count signal can be set before the issue of the multiplication instruction by using a different instruction. It is not necessary to set the shift bit count signal by using the multiplication instruction. This prevents the length of the instruction code from increasing.

Furthermore, a shift count selection means for selecting the shift bit count signal of the shift count retention means or a zero signal indicating a zero bit and for outputting the selected signal to the rounding signal generation means and the shift means is provided between the shift count retention means and the rounding signal generation means, and when the shift count selection means selects and outputs the zero signal, the rounding signal generation means generates a rounding signal including a rounding value to be added to a low-order bit adjacent to the least significant bit in the reference cut-out bit range of the multiplication result, and the shift means carries out no shift on the multiplication result obtained after rounding. Therefore, when the zero signal is selected and output, it is possible to use the conventional multiplication method, wherein rounding is carried out at a predetermined fixed position, and no shift is carried out.

Furthermore, a shift input switching means for selecting the output signal of the addition means or a different signal and for outputting the selected signal to the shift means may be provided between the addition means and the shift means. With this configuration, the different signal can be shifted only, without being multiplied.

DESCRIPTION OF PREFERRED EMBODIMENTS

Multiplication methods and multiplication circuits for executing fixed point multiplication instructions used for digital signal processing in image and sound processing fields in accordance with embodiments of the present invention will be described below with reference to the accompanying drawings.

<First Embodiment>

Figure 1:
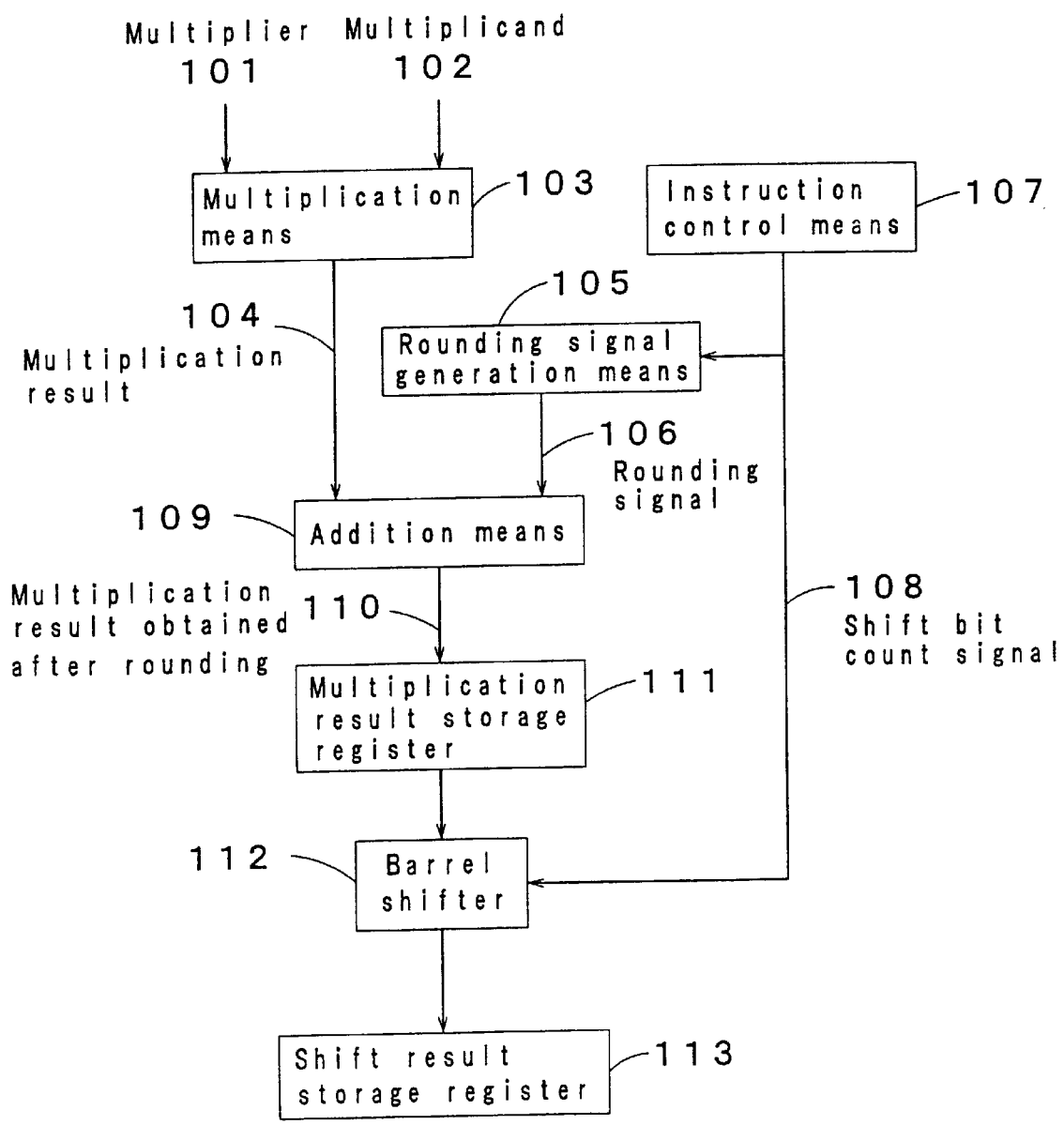
FIG. 1 is a block diagram showing a multiplication circuit in accordance with a first embodiment of the present invention.

FIG. 1 is a block diagram showing a multiplication circuit in accordance with a first embodiment of the present invention. Referring to FIG. 1, numeral 101 designates a multiplier, numeral 102 designates a multiplicand, numeral 103 designates a multiplication means, numeral 104 designates a multiplication result used as the output of the multiplication means 103, numeral 105 designates a rounding signal generation means, numeral 106 designates a rounding signal used as the output of the rounding signal generation means 105, numeral 107 designates an instruction control means of a processor, numeral 108 designates a shift bit count signal controlled by the instruction control means 107, numeral 109 designates an addition means, numeral 110 designates a multiplication result obtained after rounding as the output of the addition means 109, numeral 111 designates a register used as a means for storing the multiplication result 110 obtained after rounding, numeral 112 designates a barrel shifter used as a shift means, and numeral 113 designates a register used as a means for storing the output of the barrel shifter 112.

The multiplier 101 and the multiplicand 102 obtained by a multiplication instruction issued by the processor are input to the multiplication means 103, and the multiplication means 103 outputs the multiplication result 104. The shift bit count signal 108 output from the instruction control mean 107 is input to the rounding signal generation means 105, and the rounding signal generation means 105 generates the rounding signal 106. The multiplication result 104 and the rounding signal 106 are input to the addition means 109, and the addition means 109 outputs the multiplication result 110 obtained after rounding. The multiplication result 110 obtained after rounding is stored temporarily in the register 111 used as a multiplication result storage means. The output of the register 111 is input to the barrel shifter 112 used as a shift means, and the input signal is shifted depending on the shift bit count signal 108 output from the instruction control means 107. The output of the barrel shifter 112 is stored in the register 113 used as a means for storing the shift output.

With this configuration, when a multiplication instruction is issued, the multiplication of the multiplier 101 and the multiplicand 102 is executed by the multiplication means 103, and the multiplication result 104 is obtained. At the same time, by receiving the shift bit count signal 108 output beforehand from the instruction control means 107, the rounding signal generation means 105 generates the rounding signal 106. By adding the multiplication result 104 to the rounding signal 106 by using the addition means 109, the multiplication result 110 obtained after rounding is obtained and stored in the multiplication result storage register 111, thereby ending the execution of the multiplication instruction.

When a shift instruction is issued next by using the multiplication result storage register 111, the multiplication result stored in the multiplication result storage register 111 is shifted by the barrel shifter 112. Since the shift count of the barrel shifter 112 is determined by the shift bit count signal 108 which was also issued by the instruction control means 107 when the multiplication instruction was issued, the multiplication result stored in the multiplication result storage register 111 is shifted by the shift count indicated by the shift bit count signal 108, and the shifted value is stored in the shift result storage register 113.

Figure 6:
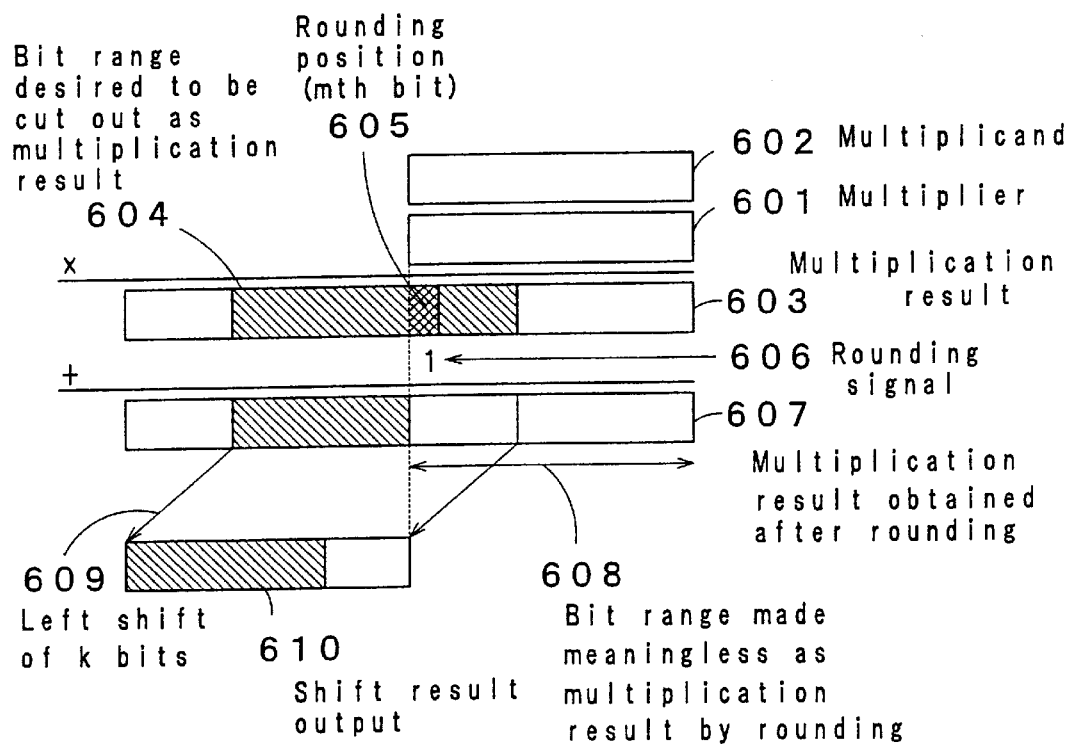
FIG. 6 is a conceptual view showing a conventional multiplication method provided with an additional process for shifting a multiplication result.

Multiplication methods carried out by the multiplication circuit in accordance with the present embodiment of the present invention will be described below referring to FIGS. 6 to 8. FIG. 6 is a conceptual view showing a conventional multiplication method provided with an additional process for shifting a multiplication result, shown for convenience of comparison with the present invention.

First, the multiplication method shown in FIG. 6 will be described below. Numeral 601 designates a multiplier, numeral 602 designates a multiplicand, numeral 603 designates a multiplication result, numeral 604 designates a bit range desired to be cut out from the multiplication result 603, numeral 605 is a predetermined rounding position where rounding is executed, numeral 606 designates a rounding signal, numeral 607 designates a multiplication result obtained after rounding, numeral 608 designates a bit range made meaningless as a multiplication result by rounding, numeral 609 designates a left shift of k bits taken as an example of a shift operation used to cut out a bit range, and numeral 610 designates a shift result output after the shift operation.

When it is assumed that the rounding position 605 for the multiplication result 603 is located at the mth bit from least significant bit, the multiplication result 607 obtained after rounding is not subjected to a shift operation, that is, the multiplication result 607 obtained after rounding is subjected to a shift of 0 bits, and then output, after 1 is added to the mth bit from least significant bit as a rounding process. In this case, the output, that is, the shift result output 610, is assumed to be a high-order bit portion having its least significant bit at the (m+1)th bit from the least significant bit of the multiplication result 607.

When a bit range desired by the user is cut out from the multiplication result 603 by using a shift process, that is, when the range indicated by the bit range 604 is cut out for example in this case, a rounding process is executed at the predetermined rounding position 605 without exception if the rounding process of the conventional multiplication method is used. As a result, the desired shift result output 610 cut out by the left shift 609 of k bits includes meaningless bits as a multiplication result. For this reason, when the range indicated by the bit range 604 is desired to be cut out by using the conventional multiplication method, the range is cut out by discarding, without executing rounding. In this case, a large operation error occurs because of nonexecution of rounding, or rounding must be executed by a different process, thereby increasing process cycles.

In comparison with the conventional method, the multiplication methods shown in FIGS. 7 and 8 will be described below.

Figure 7:
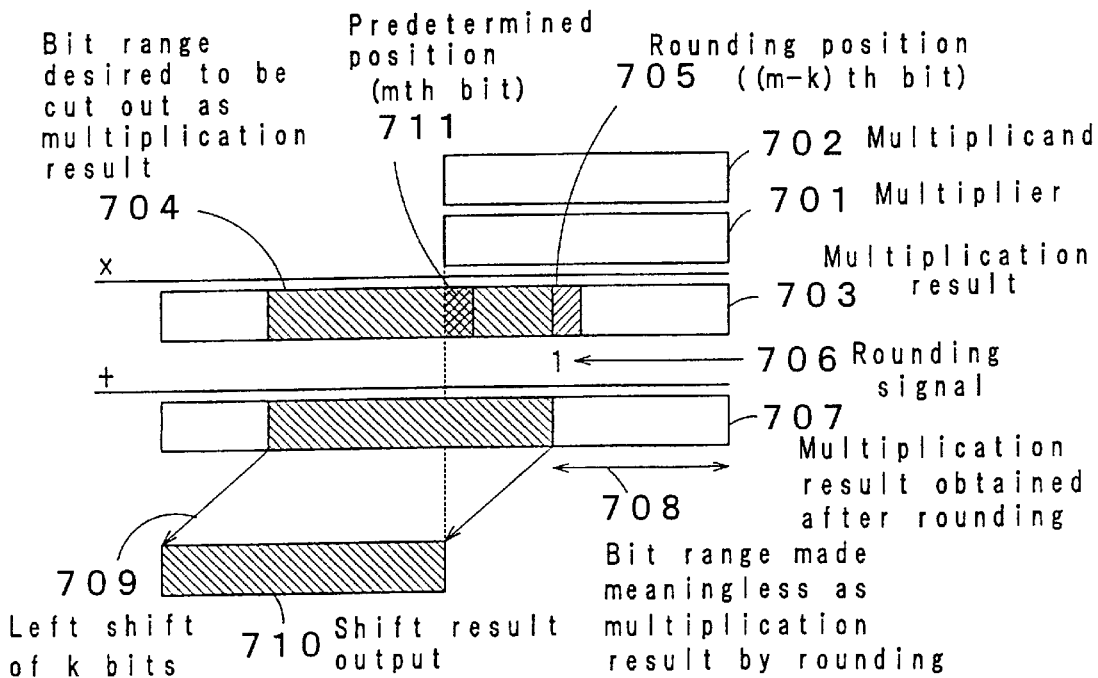
FIG. 7 is a conceptual view showing a multiplication method in accordance with the present invention.

Referring to FIG. 7, numeral 701 designates a multiplier, numeral 702 designates a multiplicand, numeral 703 designates a multiplication result, numeral 704 designates a bit range desired to be cut out from the multiplication result 703, numeral 705 is a rounding position where rounding is executed, numeral 706 designates a rounding signal, numeral 707 designates a multiplication result obtained after rounding, numeral 708 designates a bit range made meaningless as a multiplication result by rounding, numeral 709 designates a left shift of k bits taken as an example of a shift operation for cutting out a bit range, numeral 710 is a shift result output after the shift operation, and numeral 711 designates the same predetermined rounding position as the predetermined rounding position 605 in the conventional method shown in FIG. 6.

In a manner similar to that of the conventional method, when it is assumed that the predetermined rounding position 711 for the multiplication result 703 is located at the mth bit from the least significant bit, the multiplication result 707 obtained after rounding is not subjected to a shift operation, that is, the multiplication result 707 obtained after rounding is subjected to a shift of 0 bits, and then output, after rounding is executed at the predetermined rounding position 711. In this case, the output, that is, the shift result output 710, is assumed to be a high-order bit portion having its least significant bit at the (m+1)th bit from the least significant bit of the multiplication result 707. Furthermore, when it is assumed that the predetermined rounding position 711 is located at the mth bit from the least significant bit of the multiplication result 703, the high-order bit portion having its least significant bit at the (m+1)th bit from the least significant bit of the multiplication result 703 is a reference cut-out bit range.

When the range indicated by the bit range 704 of the multiplication result 703 is desired to be cut out, and when it is assumed that the predetermined rounding position 711 is basically located at the mth bit from the least significant bit in consideration of the fact that a shift count required for a shift operation for cutting out is indicated by a left shift 709 of k bits, a signal having "1" at the (m−k)th bit is generated as the rounding signal 706. In other words, the rounding position is shifted to the right by k bits. Consequently, the bit range 704 desired to be cut out as the multiplication result does not include any meaningless bit range as a multiplication result, and output as the shift result output 710 after appropriate rounding. The bit range 704 desired to be cut out from the multiplication result 703 as the multiplication result is a given cut-out bit range.

Figure 8:
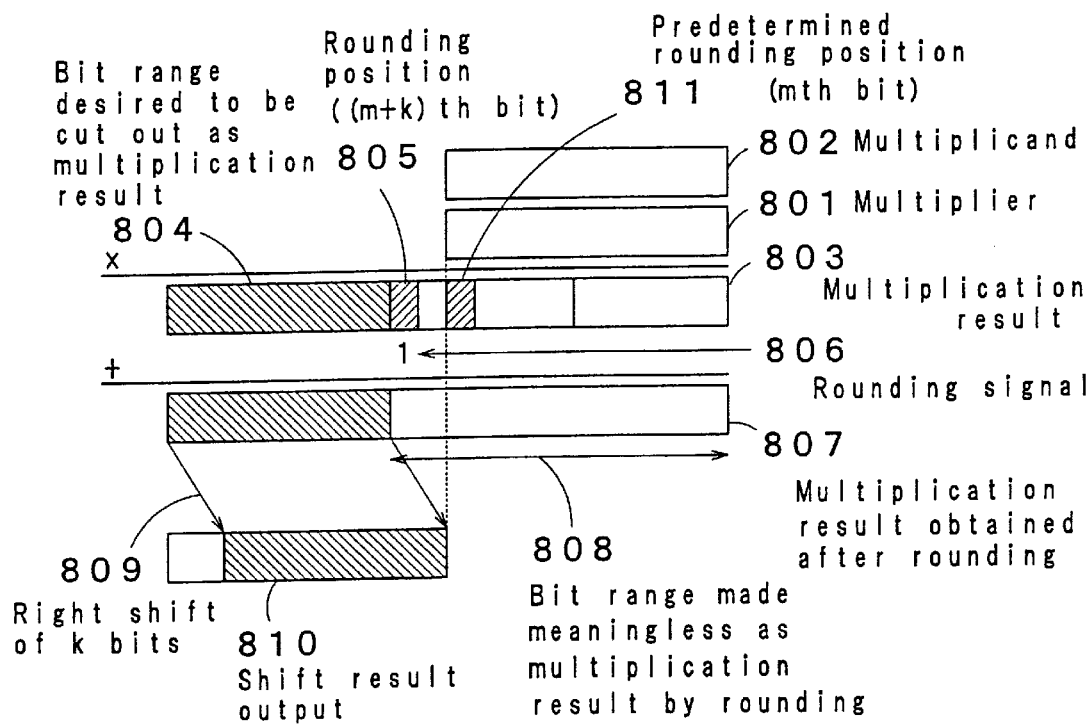
FIG. 8 is a conceptual view showing another multiplication method in accordance with the present invention.
Figure 9:
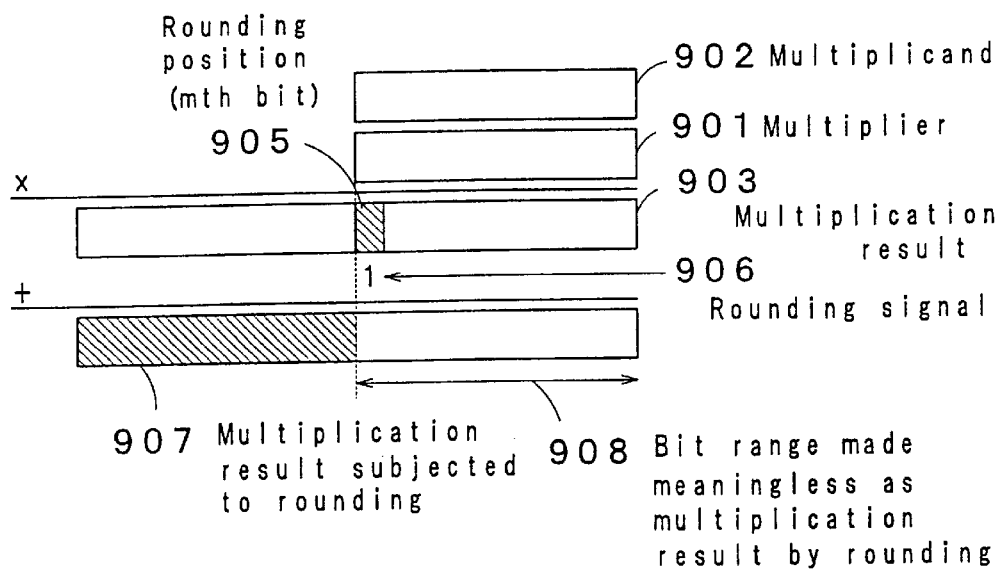
FIG. 9 is a conceptual view showing a conventional multiplication method.

Furthermore, referring to FIG. 8, numeral 801 designates a multiplier, numeral 802 designates a multiplicand, numeral 803 designates a multiplication result, numeral 804 designates a bit range desired to be cut out from the multiplication result 803, numeral 805 is a rounding position where rounding is executed, numeral 806 designates a rounding signal, numeral 807 designates a multiplication result obtained after rounding, numeral 808 designates a bit range made meaningless as a multiplication result by rounding, numeral 809 designates a right shift of k bits taken as an example of a shift operation for cutting out a bit range, numeral 810 is a shift result output after the shift operation, and numeral 811 designates the same predetermined rounding position as the predetermined position 605 in the conventional method shown in FIG. 6.

When the range indicated by the bit range 804 of the multiplication result 803 is desired to be cut out, and when it is assumed that the predetermined rounding position 811 is basically located at the mth bit from the least significant bit in consideration of the fact that a shift count required for a shift operation for cutting out is indicated by a right shift 809 of k bits, a signal having "1" at the (m+k)th bit is generated as the rounding signal. In other words, the rounding position is shifted to the left by k bits. Consequently, the bit range 804 desired to be cut out as the multiplication result is output as the shift result output 810 after appropriate rounding. When it is assumed that the predetermined rounding position 811 is located at the mth bit from the least significant bit of the multiplication result 803, the high-order bit portion having its least significant bit at the (m+1)th bit from the least significant bit of the multiplication result 803 is a reference cut-out bit range. The bit range 804 desired to be cut out from the multiplication result 803 as the multiplication result is a given cut-out bit range.

As described above, with the present embodiment, the shift bit count signal 108 output from the instruction control means 107 is input to the barrel shifter 112 and the rounding signal generation means 105. The rounding signal generation means 105 generates the rounding signal 106 being different depending on the shift bit count signal 108. By executing rounding by using the rounding signal 106, rounding can be executed at an appropriate rounding position desired by the user when a bit range required for a process using the multiplication result subjected to rounding is cut out by a shift operation. This prevents operation errors and also prevents process cycles from increasing. Furthermore, unlike the conventional method, it is not necessary to shift the multiplier or multiplicand beforehand, and it is not necessary to execute rounding depending on the bit range desired to be cut out from the multiplication result after the multiplication is executed without rounding, thereby preventing the amount of processing from increasing.

Moreover, with the present embodiment, when the multiplication, rounding and cutting out of the desired bit range by shifting the multiplication result are executed by a single instruction through pipeline processing, three cycles are required for the processing from the multiplication by the multiplication means 103 to the shift process by the barrel shifter 112 via the rounding process by the addition means 109.

In the above-mentioned descriptions, a configuration where the multiplication result 104 is used as an input of the addition means 109 is taken as an example. However, when data to be shifted is input, a shift instruction provided with a rounding function can also be executed in the same way.

<Second Embodiment>

Figure 2:
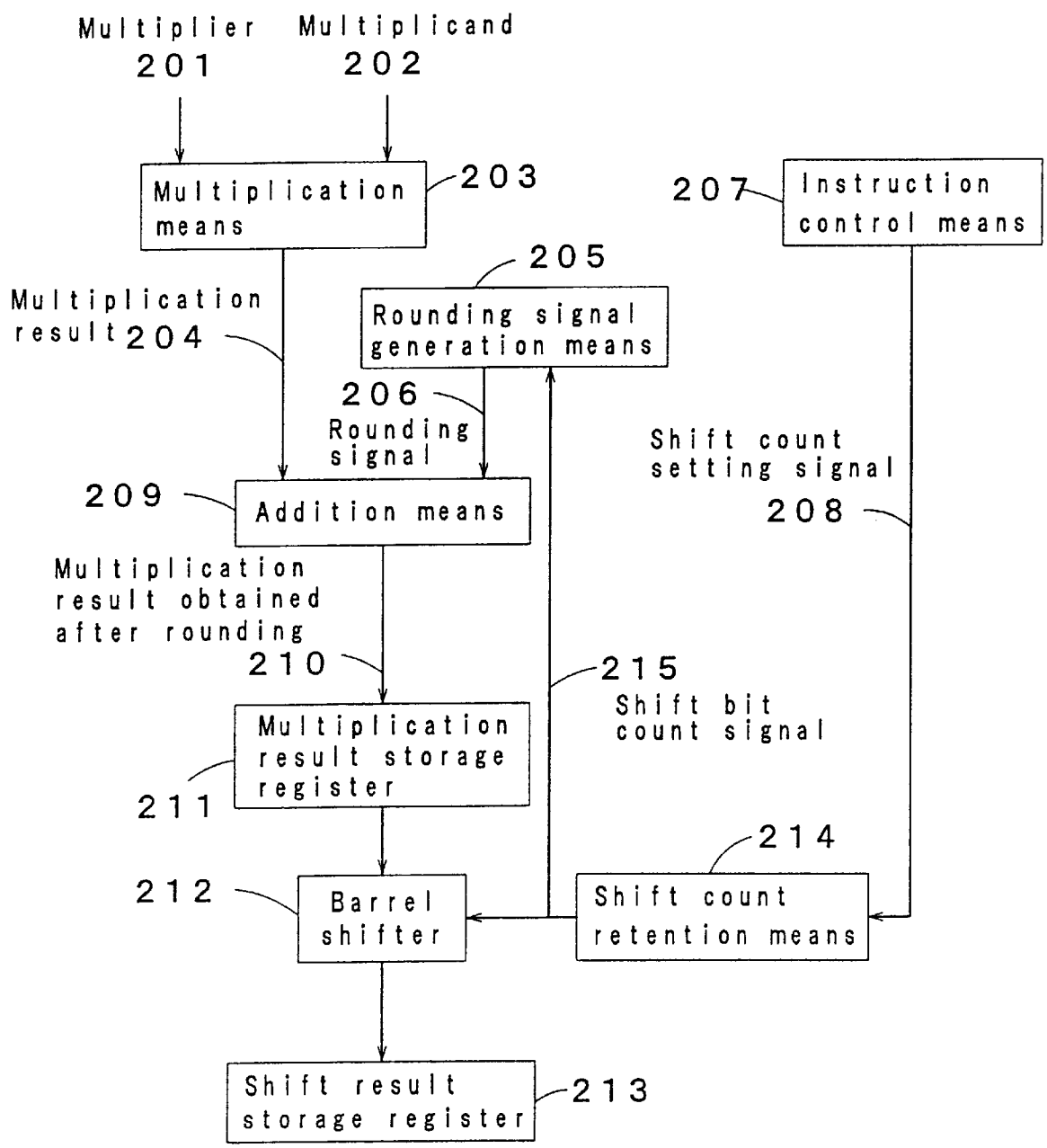
FIG. 2 is a block diagram showing a multiplication circuit in accordance with a second embodiment of the present invention.

FIG. 2 is a block diagram showing a multiplication circuit in accordance with a second embodiment of the present invention. Referring to FIG. 2, numeral 201 designates a multiplier, numeral 202 designates a multiplicand, numeral 203 designates a multiplication means, numeral 204 designates a multiplication result used as the output of the multiplication means 203, numeral 205 designates a rounding signal generation means, numeral 206 designates a rounding signal used as the output of the rounding signal generation means 205, numeral 207 designates an instruction control means of a processor, numeral 208 designates a shift count setting signal controlled by the instruction control means 207, numeral 209 designates an addition means, numeral 210 designates a multiplication result obtained after rounding as the output of the addition means 209, numeral 211 designates a register used as a means for storing the multiplication result 210 obtained after rounding, numeral 212 designates a barrel shifter used as a shift means, numeral 213 designates a register used as a means for storing the output of the barrel shifter 212, numeral 214 designates a shift count retention means used as a means for retaining the shift count setting signal 208, and numeral 215 designates a shift bit count signal as the output of the shift count retention means 214.

The second embodiment differs from the first embodiment in that the second embodiment is provided with the shift count retention means 214. Other than the shift count retention means 214, the configuration and operation are the same as those of the first embodiment, and their descriptions are omitted.

The shift count setting signal 208 is temporarily stored in the shift count retention means 214. The output of the shift count retention means 214 is input to the rounding signal generation means 205 and the barrel shifter 212 as the shift bit count signal 215. In other words, in the second embodiment, a shift count can be set in the shift count retention means 214 before the issue of the multiplication instruction by adding the shift count retention means 214 to the configuration of the first embodiment.

As described above, in addition to the effects of the first embodiment, by providing the shift count retention means 214 in the present embodiment, the shift count can be set beforehand by using a different instruction. Setting the shift count twice, which is necessary when the multiplication instruction and the shift instruction using the result of the multiplication are issued in the case of the first embodiment, is not necessary in the case of the first embodiment. Hence, it is not necessary to additionally provide shift count setting fields for instruction codes. Moreover, the circuit of the instruction control means 207 can be simplified.

<Third Embodiment>

Figure 3:
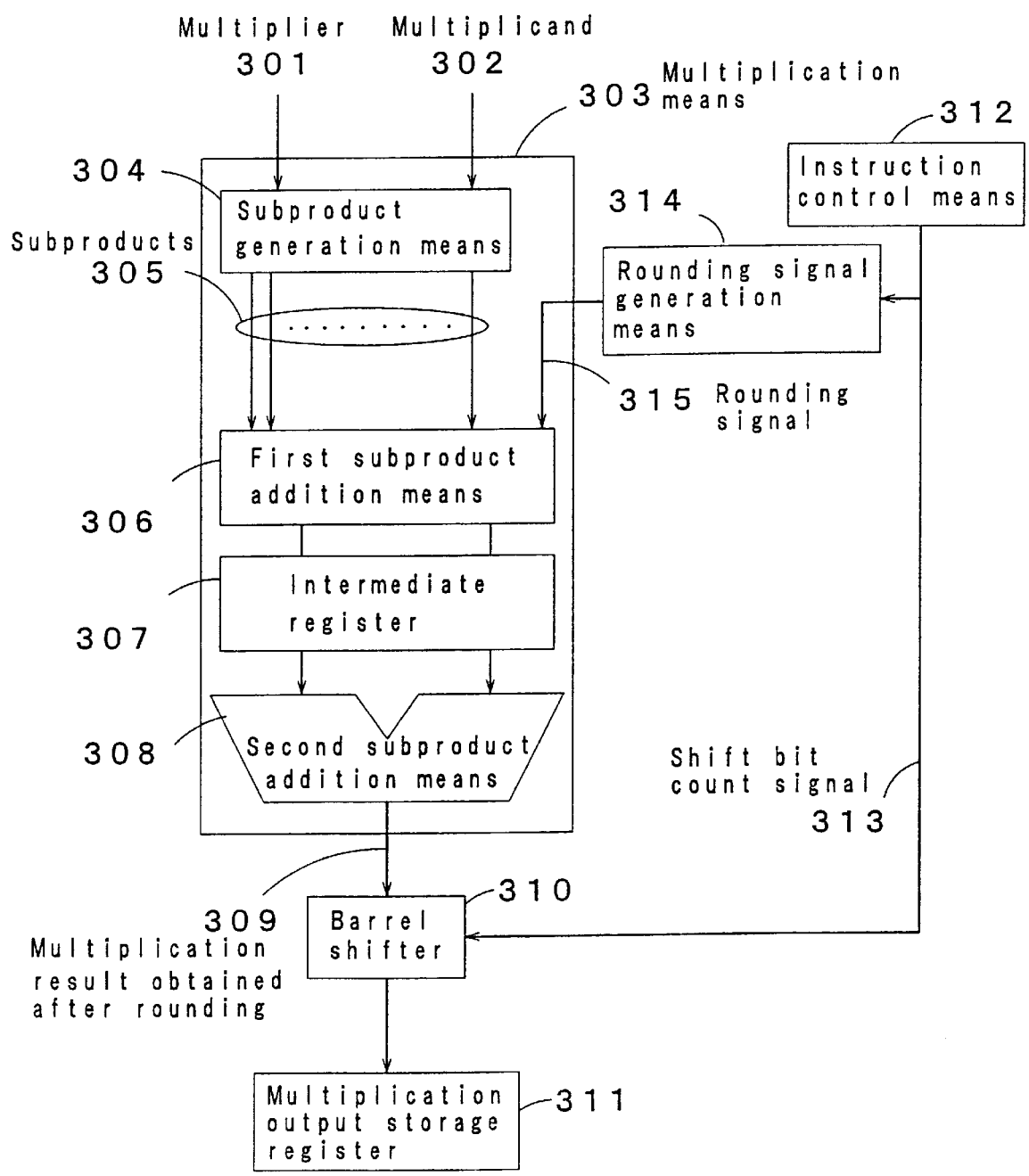
FIG. 3 is a block diagram showing a multiplication circuit in accordance with a third embodiment of the present invention.

FIG. 3 is a block diagram showing a multiplication circuit in accordance with a third embodiment of the present invention. Referring to FIG. 3, numeral 301 designates a multiplier, numeral 302 designates a multiplicand, numeral 303 designates a multiplication means, numeral 304 designates a subproduct generation means as a component of the multiplication means 303, numeral 305 designates subproducts as the output of the subproduct generation means 304, numeral 306 designates a first subproduct addition means as a component of the multiplication means 303, numeral 307 designates an intermediate register for temporarily storing an intermediate result obtained in the first subproduct addition means 306, numeral 308 designates a second subproduct addition means for adding the output of the intermediate register 307 and used as a component of the multiplication means 303, numeral 309 designates a multiplication result obtained after rounding and used as the output of the second subproduct addition means 308, numeral 310 designates a barrel shifter used as a shift means, numeral 311 designates a register used as a means for storing the output of the barrel shifter 310, numeral 312 designates an instruction control means, numeral 313 designates a shift bit count signal used as the output of the instruction control means 312, numeral 314 designates a rounding signal generation means, and numeral 315 designates a rounding signal used as the output of the rounding signal generation means 314.

The multiplier 301 and the multiplicand 302 are input to the subproduct generation means 304, and the obtained subproducts 305 are input to the first subproduct addition means 306. The shift bit count signal 313 output from the instruction control means 312 is input to the rounding signal generation means 314, and the rounding signal generation means 314 generates the rounding signal 315. The rounding signal 315 is input to the first subproduct addition means 306. When the number of addends becomes two in the first subproduct addition means 306, the intermediate result is stored in the intermediate register 307. The output of the intermediate register 307 is input to the second subproduct addition means 308 and added, and the result is output as the multiplication result 309 obtained after rounding. The multiplication result 309 obtained after rounding is input to the barrel shifter 310. In the barrel shifter 310, the multiplication result 309 obtained after rounding is shifted depending on the shift bit count signal 313 output from the instruction control means 312. A bit range desired to be cut out as a multiplication result is cut out and stored in the multiplication output storage register 311.

In this configuration, when a multiplication instruction is issued, the subproducts of the multiplier 301 and the multiplicand 302 are generated by the subproduct generation means 304. At the same time, the rounding signal generation means 314 generates the rounding signal 315 after receiving the shift bit count signal 313 output from the instruction control means 312. The subproducts 305 and the rounding signal 315 are added by the first subproduct addition means 306. When addition is executed by the first subproduct addition means 306 until the number of addends becomes two, the values are stored temporarily in the intermediate register 307. The output values of the intermediate register 307 are added by the second subproduct addition means 308 comprising a two-input adder, and the multiplication result 309 obtained after rounding is output. The multiplication result 309 obtained after rounding is input to the barrel shifter 310, and shifted by the bit count having been set by the shift bit count signal 313 output from the instruction control means 312. As a result, a bit range desired to be cut out as a multiplication result is cut out, and stored in the multiplication output storage register 311.

As described above, in addition to the effects of the first embodiment, the multiplication means 303 comprising the subproduct generation means 304, the first subproduct addition means 306, the intermediate register 307 and the second subproduct addition means 308 is used in the present embodiment instead of the multiplication means 103 and the addition means 109 of the first embodiment. Therefore, by adding the rounding signal 315 by using the subproduct addition means used as a component of a cell repeated array multiplier generally used as a high-speed multiplier, the rounding process can be included in the multiplication process, whereby operation time can be shortened and the size of the circuit can be made smaller. As a result, when multiplication, rounding and cutting out of a desired bit range by shifting the multiplication result are executed by a single instruction through pipeline processing, two cycles are used for the pipeline processing: one cycle up to the generation of the subproducts and the first subproduct addition, and one cycle up to the second subproduct addition and the shift operation by the barrel shifter 310. Therefore, in comparison with the first embodiment requiring three cycles, the amount of processing can be decreased.

<Fourth Embodiment>

Figure 4:
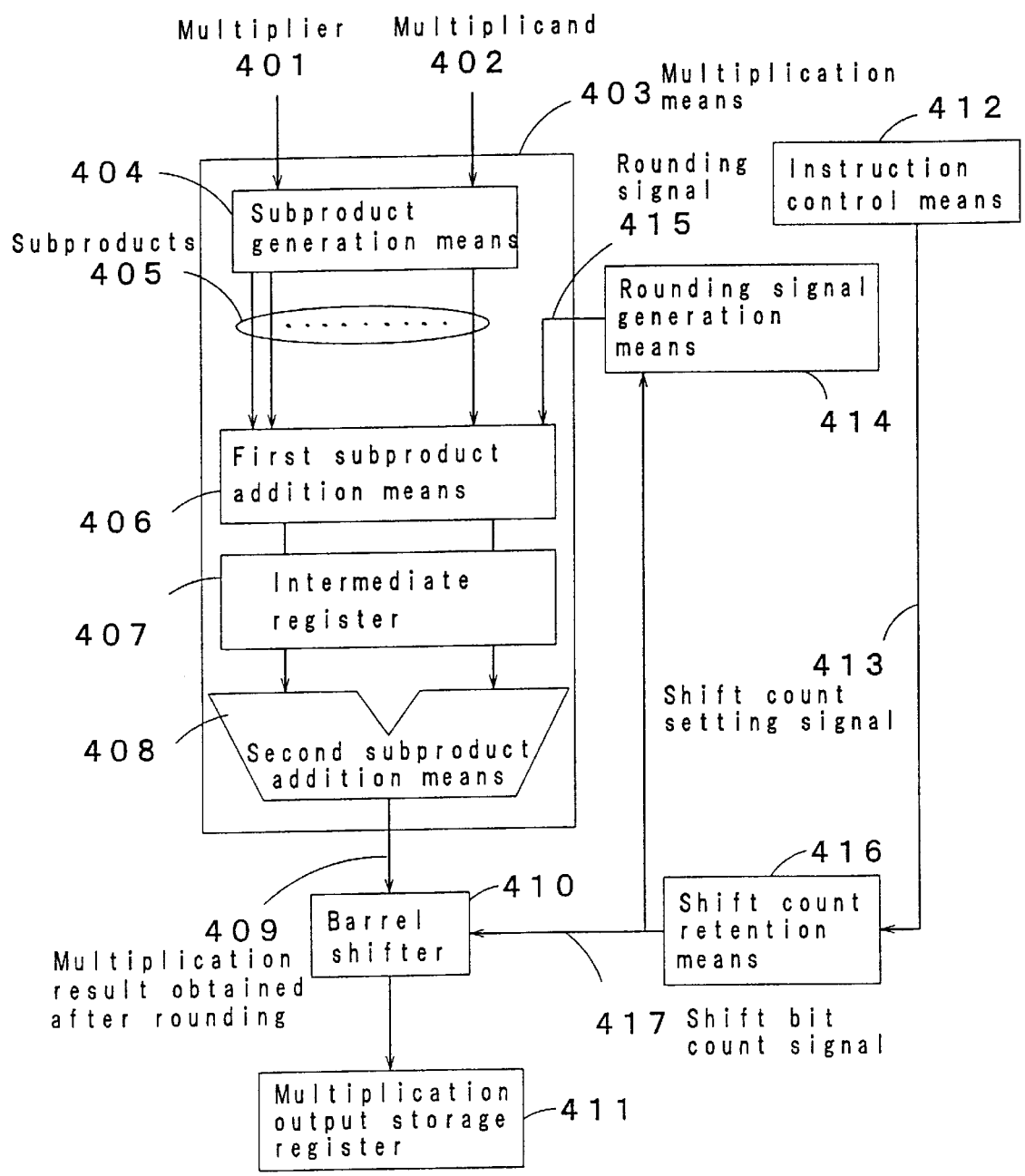
FIG. 4 is a block diagram showing a multiplication circuit in accordance with a fourth embodiment of the present invention.

FIG. 4 is a block diagram showing a multiplication circuit in accordance with a fourth embodiment of the present invention. Referring to FIG. 4, numeral 401 designates a multiplier, numeral 402 designates a multiplicand, numeral 403 designates a multiplication means, numeral 404 designates a subproduct generation means as a component of the multiplication means 403, numeral 405 designates subproducts as the output of the subproduct generation means 404, numeral 406 designates a first subproduct addition means as a component of the multiplication means 403, numeral 407 designates an intermediate register for temporarily storing an intermediate result obtained in the first subproduct addition means 406, numeral 408 designates a second subproduct addition means for adding the output of the intermediate register 407 and used as a component of the multiplication means 403, numeral 409 designates a multiplication result obtained after rounding and used as the output of the second subproduct addition means 408, numeral 410 designates a barrel shifter used as a shift means, numeral 411 designates a register used as a means for storing the output of the barrel shifter 410, numeral 412 designates an instruction control means, numeral 413 designates a shift count setting signal used as the output of the instruction control means 412, numeral 414 designates a rounding signal generation means, numeral 415 designates a rounding signal used as the output of the rounding signal generation means 414, numeral 416 designates a shift count retention means used as a means for retaining the shift count setting signal 413, and numeral 417 designates a shift bit count signal used as the output of the shift count retention means.

The fourth embodiment differs from the third embodiment in that the fourth embodiment is provided with the shift count retention means 416. Other than the shift count retention means 416, the configuration and operation are the same as those of the third embodiment, and their descriptions are omitted.

The shift count setting signal 413 is temporarily stored in the shift count retention means 416. The output of the shift count retention means 416 is input to the rounding signal generation means 414 and the barrel shifter 410 as the shift bit count signal 417. In other words, in the fourth embodiment, a shift count can be set in the shift count retention means 416 by the instruction issued before the multiplication instruction by adding the shift count retention means 416 to the configuration of the third embodiment.

As described above, in addition to the effects of the third embodiment, by providing the shift count retention means 416 in the present embodiment, the shift count can be set beforehand by using a different instruction. Setting the shift count twice, which is necessary when the multiplication instruction and the shift instruction using the result of the multiplication are issued in the case of the third embodiment, is not necessary in the case of the third embodiment. This can prevent shift count setting fields for instruction codes from increasing.

<Fifth Embodiment>

Figure 5:
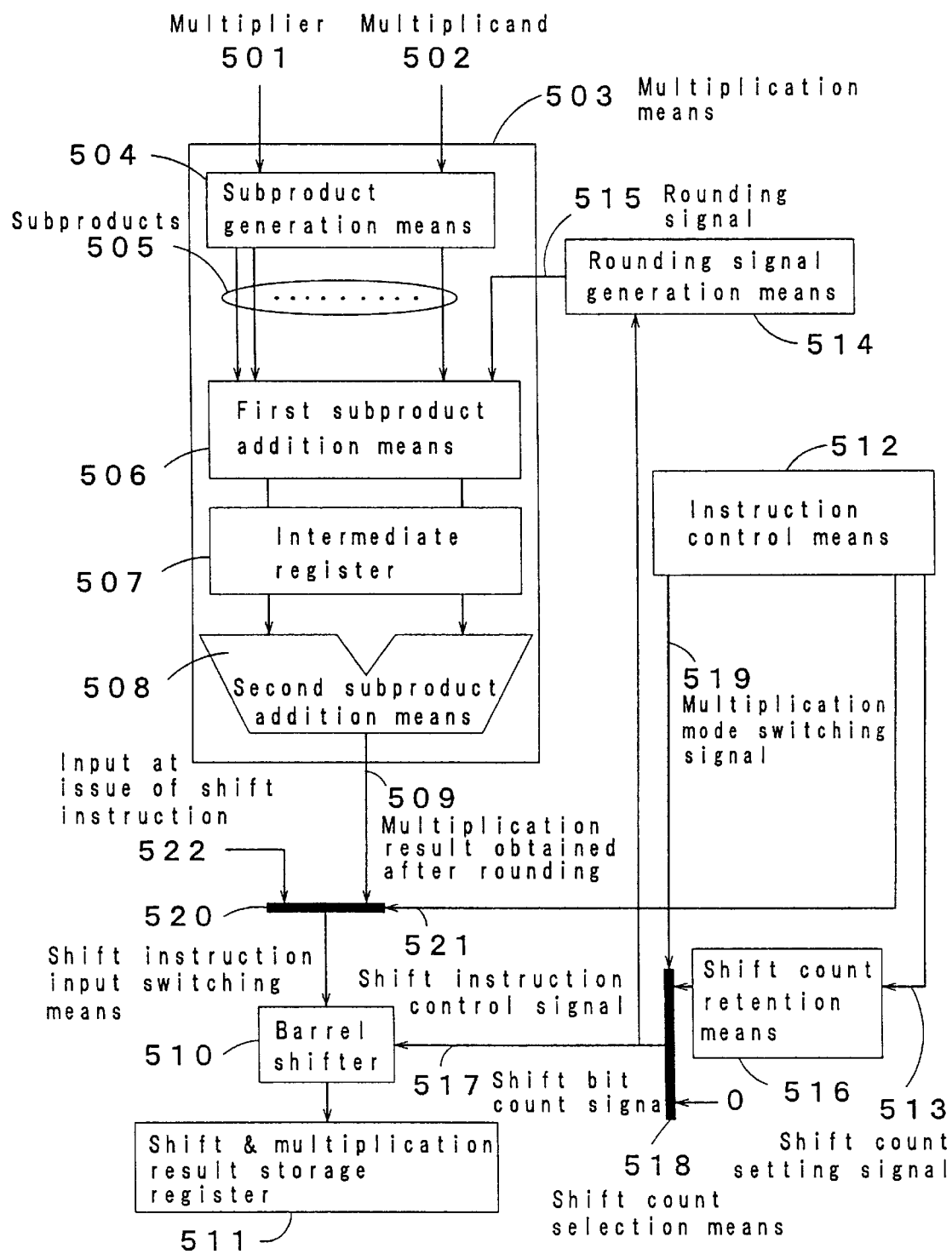
FIG. 5 is a block diagram showing a multiplication circuit in accordance a fifth embodiment of the present invention.

FIG. 5 is a block diagram showing a multiplication circuit in accordance with a fifth embodiment of the present invention. Referring to FIG. 5, numeral 501 designates a multiplier, numeral 502 designates a multiplicand, numeral 503 designates a multiplication means, numeral 504 designates a subproduct generation means as a component of the multiplication means 503, numeral 505 designates subproducts as the output of the subproduct generation means 504, numeral 506 designates a first subproduct addition means as a component of the multiplication means 503, numeral 507 designates an intermediate register for temporarily storing an intermediate result from the first subproduct addition means 506, numeral 508 designates a second subproduct addition means for adding the output of the intermediate register 507 and used as a component of the multiplication means 503, numeral 509 designates a multiplication result obtained after rounding and used as the output of the second subproduct addition means 508, numeral 510 designates a barrel shifter used as a shift means, numeral 511 designates a register used as a means for storing the output of the barrel shifter 510, numeral 512 designates an instruction control means, numeral 513 designates a shift count setting signal used as the output of the instruction control means 512, numeral 514 designates a rounding signal generation means, numeral 515 designates a rounding signal used as the output of the rounding signal generation means 514, numeral 516 designates a shift count retention means used as a means for retaining the shift count setting signal 513, numeral 517 designates a shift bit count signal used as the output of the shift count storage means, numeral 518 designates a shift count selection means, numeral 519 designates a multiplication mode switching signal used as the selection signal for the shift count selection means 518, numeral 520 designates a shift instruction input switching means, numeral 521 designates a shift instruction control signal used as the switching signal for the shift instruction input switching means 520, and numeral 522 designates an input at the issue of the shift instruction. The multiplication mode switching signal 519 is used to switch between one mode for attaining the multiplication method of the present invention, wherein the multiplication result is shifted and rounded depending on the shift count, and the other mode for attaining an ordinary multiplication method, wherein the multiplication result is not shifted or rounded depending on the shift.

The fifth embodiment differs from the fourth embodiment in that the fifth embodiment is provided with the shift count selection means 518 for selecting the output of the shift count retention means 516 or "0" and the shift instruction input switching means 520. Other than the means, the configuration and operation are the same as those of the fourth embodiment, and their descriptions are omitted.

The shift count setting signal 513 output from the instruction control means 512 is input to the shift count retention means 516, and the output of the shift count retention means 516 is input to one of the inputs of the shift count selection means 518. The shift count selection means 518 comprises a two-input selector, and the other input thereof is fixed at "0". In addition, the multiplication mode switching signal 519 output from the instruction control means 512 is input as the selection signal from the shift count selection means 518. The output of the shift count selection means 518 is input to the rounding signal generation means 514 and the barrel shifter 510 as the shift bit count signal 517. Furthermore, the instruction control signal 521 output from the instruction control means 512 is input as the selection signal for the shift instruction input switching means 520 comprising a two-input selector. One of the two inputs of the shift instruction input switching means 520 is the multiplication result 509 used as the output of the multiplication means 503, and the other is the input 522 at the issue of the shift instruction.

With this configuration, when the shift instruction input switching means 520 outputs the input from the multiplication means 503, i.e., the multiplication result 509 obtained after rounding, the output of the shift count selection means 518 is switched to "0" or the shift count stored in the shift count retention means 516 depending on the multiplication mode switching signal 519 output from the instruction control means 512. In the case that the shift count stored in the shift count retention means 516 is output for example as the output of the shift count selection means 518, the rounding signal generation means 514 receives this output and generates such a rounding signal as that shown in FIGS. 7 and 8, and the barrel shifter 510 executes a shift process by the shift count having been stored in the shift count storage means 516. In the case that "0" is output for example as the output of the shift count selection means 518, the rounding signal generation means 514 receives the output and generates a fixed signal used as the rounding signal, for example, a signal having "1" only at the mth bit from the least signal bit. In addition, the barrel shifter 510 outputs its input after a shift of 0 bits, that is, without shifting.

In the case that "0" has been stored in the shift count retention means 416 as the shift count setting signal 413 in the configuration shown in FIG. 4 without the shift count selection means 518, it is possible to obtain the same operation as that obtained when the shift instruction input switching means 520 in the configuration shown in FIG. 5 outputs the multiplication result 509 obtained after rounding, and the shift count selection means 518 selects and outputs "0". However, by providing the shift count selection means 518 as shown in the configuration of FIG. 5, in the case that the same shift count is selected as the output of the shift count selection means 518, i.e., the shift bit count signal 517 before or after "0" is selected, the shift count having been selected before "0" is selected has also been stored in the shift retention means 516 after "0" is selected. Therefore, it is not necessary for the instruction control means 512 to set the shift count again in the shift count retention means 516 after the shift count selection means 518 selects "0", whereby high-speed processing can be attained.

In addition, since the shift instruction input switching means 520 is provided, the input 522 at the issue of the shift instruction directly input to the shift instruction input switching means 520 is output to the barrel shifter 510 without passing through the multiplication means 503. The shift instruction can thus be executed independently.

As described above, in addition to the effects of the fourth embodiment, by providing the shift count selection means 518 in the present embodiment so that the output of the shift count selection means 518 is switched depending on the multiplication mode switching signal 519, both the multiplication method of the present invention, wherein the multiplication result is shifted and rounded depending on the shift count, and the ordinary multiplication method, wherein the multiplication result is not shifted or rounded depending on the shift, can be attained by using the same circuit.

In addition, by providing the shift instruction input switching means 520, independent execution of the shift instruction can be attained easily.

The shift count retention means 516, the shift count selection means 518 and the shift instruction input switching means 520 may be additionally provided in the configuration of the first embodiment shown in FIG. 1 in the same way. The shift count selection means 518 may also be additionally provided in the configuration of the second embodiment shown in FIG. 2 in the same way. Furthermore, only the shift instruction input switching means 518 may be additionally provided in the configurations of the first to fourth embodiments shown in FIGS. 1 to 4.

What is claimed is:

1. A multiplication method for carrying out a multiplication process by generating and adding subproducts, comprising:

a rounding signal generation process for generating a rounding signal including a rounding value to be added to a low-order bit adjacent to the least significant bit in a given cut-out bit range of a multiplication result obtained by said multiplication process on the basis of a shift bit count signal corresponding to the difference between the least significant bit in said given cut-out bit range of said multiplication result obtained by said multiplication process and the least significant bit in a reference cut-out bit range;

a subproduct generation process for generating subproducts of a multiplier and a multiplicand obtained by a multiplication instruction;

an addition process for adding all of said subproducts generated by said subproduct generation process to said rounding signal in order to generate a multiplication result obtained after rounding; and a shift process for shifting said multiplication result obtained after rounding by a shift bit count indicated by said shift bit count signal in order to cut out said given cut-out bit range from said multiplication result obtained after rounding.

2. A multiplication method in accordance with claim 1, wherein said shift bit count signal is used for said rounding signal generation process and said shift process after retained temporarily.

3. A multiplication method in accordance with claim 2, wherein said shift bit count signal retained temporarily or a zero signal indicating a zero bit is selected for use in said rounding signal generation process and said shift process, and when said zero signal is selected, said rounding signal generation process generates a rounding signal including a rounding value to be added to a low-order bit adjacent to the least significant bit in said reference cut-out bit range of said multiplication result obtained by said multiplication process, and said shift process carries out no shift on said multiplication result obtained after rounding.

4. A multiplication circuit for carrying out a multiplication process by generating and adding subproducts, comprising:

a rounding signal generation means for generating a rounding signal including a rounding value to be added to a low-order bit adjacent to the least significant bit in a given cut-out bit range of a multiplication result obtained by said multiplication process on the basis of a shift bit count signal corresponding to the difference between the least significant bit in said given cut-out bit range of said multiplication result obtained by said multiplication process and the least significant bit in a reference cut-out bit range;

a subproduct generation means for generating subproducts of a multiplier and a multiplicand obtained by a multiplication instruction;

an addition means for adding all of said subproducts generated by said subproduct generation means to said rounding signal generated by said rounding signal generation means in order to generate a multiplication result obtained after rounding; and a shift means for shifting said multiplication result obtained after rounding generated by said addition means by a shift bit count indicated by said shift bit count signal in order to cut out said given cut-out bit range from said multiplication result obtained after rounding.

5. A multiplication circuit in accordance with claim 4, wherein a shift count retention means for temporarily retaining said shift bit count signal and for outputting said shift bit count signal to said rounding signal generation means and said shift means.

6. A multiplication circuit in accordance with claim 5, wherein a shift count selection means for selecting said shift bit count signal of said shift count retention means or a zero signal indicating a zero bit and for outputting the selected signal to said rounding signal generation means and said shift means is provided between said shift count retention means and said rounding signal generation means, and when said shift count selection means selects and outputs said zero signal, said rounding signal generation means generates a rounding signal including a rounding value to be added to a low-order bit adjacent to the least significant bit in said reference cut-out bit range of said multiplication result, and said shift means carries out no shift on said multiplication result obtained after rounding.

7. A multiplication circuit in accordance with claim 6, wherein a shift input switching means for selecting the output signal of said addition means or a different signal and for outputting the selected signal to said shift means is provided between said addition means and said shift means.

8. A multiplication circuit in accordance with claim 5, wherein a shift input switching means for selecting the output signal of said addition means or a different signal and for outputting the selected signal to said shift means is provided between said addition means and said shift means.

9. A multiplication circuit in accordance with claim 4, wherein a shift input switching means for selecting the output signal of said addition means or a different signal and for outputting the selected signal to said shift means is provided between said addition means and said shift means.

* * * * *